(12) United States Patent
Arimitsu et al.

(10) Patent No.: US 7,405,504 B2
(45) Date of Patent: Jul. 29, 2008

(54) ROTOR FOR ROTARY ELECTRIC MACHINE

(75) Inventors: Minoru Arimitsu, Kanagawa (JP); Kan Akatsu, Tokyo (JP)

(73) Assignees: Nissan Motor Co., Ltd., Yokohama-shi (JP); National University Corporation Tokyo University of Agriculture and Technology, Tokyo (JP)

( * ) Notice: Subject to any disclaimer, the term of this patent is extended or adjusted under 35 U.S.C. 154(b) by 166 days.

(21) Appl. No.: 11/224,109

(22) Filed: Sep. 13, 2005

(65) Prior Publication Data

US 2006/0055267 A1 Mar. 16, 2006

(30) Foreign Application Priority Data

Sep. 13, 2004 (JP) ............... 2004-265642

(51) Int. Cl.
  *H02K 1/27* (2006.01)
  *H02K 21/12* (2006.01)
(52) U.S. Cl. .................. 310/156.57; 310/156.53; 310/156.56
(58) Field of Classification Search ................ 310/156.48–156.57, 162, 165
See application file for complete search history.

(56) References Cited

U.S. PATENT DOCUMENTS 2,059,518 A * 11/1936 Harley ............... 310/156.53
6,031,311 A * 2/2000 Lee .................. 310/156.57
6,147,428 A * 11/2000 Takezawa et al. ...... 310/156.57
6,342,745 B1 1/2002 Sakai et al.
6,897,590 B2 * 5/2005 Popov ............... 310/156.56
6,987,342 B2 * 1/2006 Hans ................ 310/156.56

FOREIGN PATENT DOCUMENTS

| | | |
|---|---|---|
| CN | 1080946 C | 3/2002 |
| EP | 0 872 944 A1 | 10/1998 |
| JP | 11-355986 A | 12/1999 |
| JP | 2000-270503 A | 9/2000 |
| JP | 2001-238380 A | 8/2001 |
| JP | 2004-096868 A | 3/2004 |

OTHER PUBLICATIONS

K. Sakai et al., "High Efficiency and High Performance Motor for Energy Saving in Systems", 2001 IEEE Power Engineering Society, vol. 3 of 3, Jan. 28, 2001, pp. 1413-1418.

* cited by examiner

*Primary Examiner*—Tran Nguyen
(74) *Attorney, Agent, or Firm*—Foley & Lardner LLP

(57) ABSTRACT

A rotor for a rotary electric machine includes a rotor core made of magnetic material, and being in the form of a disk, and a plurality of magnet sets each including a pair of permanent magnets whose polarities are identical to each other. The magnet sets are arranged circumferentially in the rotor core so that the polarities of the magnet sets change alternately. The rotor core includes nonmagnetic portions each formed between adjacent two of the magnet sets.

10 Claims, 5 Drawing Sheets

ROTOR FOR ROTARY ELECTRIC MACHINE

BACKGROUND OF THE INVENTION

The present invention relates to a rotor for a rotary electric machine, and more especially to a rotor for a rotary electric machine such as a permanent magnet motor.

Japanese patent application publication No. 2004-96868 shows a rotary electric machine being an IPM (Interior Permanent Magnet) motor including a rotor, and a plurality of permanent magnets embedded in the rotor. This motor has magnetic reluctance in a direction between N pole of each permanent magnet and S pole of one permanent magnet being lower than magnetic reluctance in a direction of N pole of one permanent magnet. The motor generates reluctance torque by a difference in magnetic reluctance between d-axis and q-axis.

SUMMARY OF THE INVENTION

However, the conventional IPM motor uses NeFeBr permanent magnets with high BHmax. This NeFeBr permanent magnets are demagnetized in a high temperature state or in a state to be applied with high reverse magnetic field, and thereby can not generate inherent magnetic flux. Accordingly, the permanent magnet motor is used in a range in which permanent magnet temperature does not exceed over a temperature at which the permanent magnets are demagnetized, and in a state in which the high reverse magnetic field is not applied to the permanent magnets. In consideration with use in a range which the permanent magnet temperature does not exceed over the temperature at which the permanent magnets are demagnetized, there is need for improvements to enforce a motor cooling system, and to divide the permanent magnets. Therefore, it is not possible to prevent from increasing the cost extremely because of necessity for these improvements.

It is an object of the present invention to provide a rotor for a rotary electric machine to prevent demagnetization of permanent magnets, and to achieve operation in high temperature.

According to one aspect of the present invention, a rotor for a rotary electric machine comprises: a rotor core made of magnetic material, and being in the form of a disk; and a plurality of magnet sets each including a pair of permanent magnets whose polarities are identical to each other, the magnet sets being arranged circumferentially in the rotor core so that the polarities of the magnet sets change alternately; the rotor core including nonmagnetic portions each formed between adjacent two of the magnet sets.

DETAILED DESCRIPTION OF THE INVENTION

Figure 1:
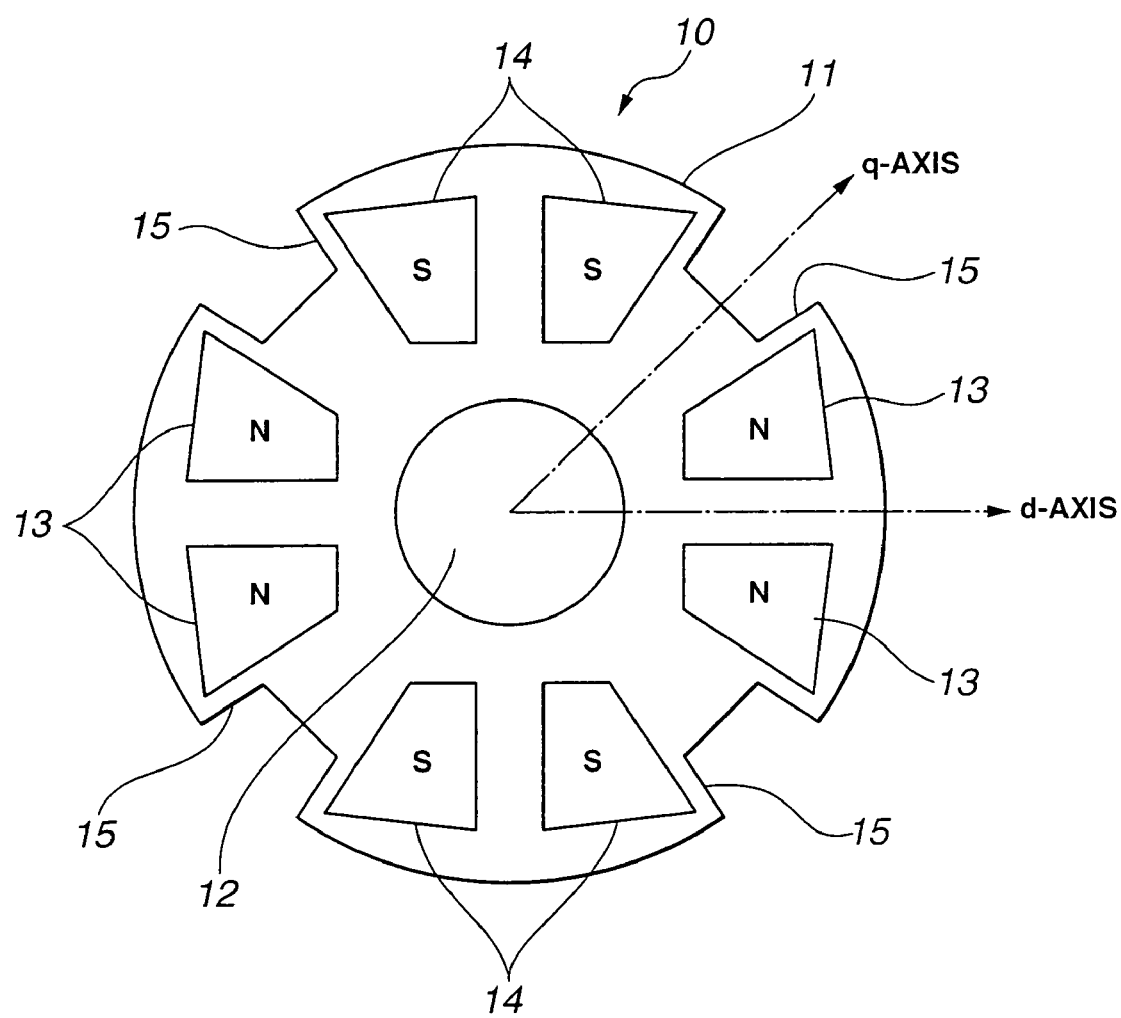
FIG. 1 is a plan view showing a rotor for a rotary electric machine according to a first embodiment of the present invention.

FIG. 1 shows a rotor 10 for a rotary electric machine according to a first embodiment of the present invention. As shown in FIG. 1, rotor 10 of the rotary electric machine includes a rotor core 11 being in the form of a disk, a shaft 12 being a rotating shaft of rotor core 11, a plurality of N pole permanent magnets 13, and a plurality of S pole permanent magnets 14. Rotor core 11 is made of magnetic material such as laminated magnetic steel sheets. Rotor core 11 includes a plurality of magnet sets each including a pair of N pole permanent magnets 13 or a pair of S pole permanent magnets 14. Near the outer circumference of rotor core 11, there are provided a plurality of the pairs (or the magnet sets) of N pole permanent magnets 13 and a plurality of the pairs (or the magnet sets) of S pole permanent magnets 14. The pairs of N pole permanent magnets 13 and the pairs of S pole permanent magnets 14 are alternately arranged in a circumferential direction of rotor core 11. (in FIG. 1, there are two pairs of N pole permanent magnets 13 and two pairs of S pole permanent magnets 14, so that rotor 10 has the sum of four pairs of the permanent magnets 13 and 14.)

The rotary electric machine acts as a permanent magnet synchronous motor which generates torque by being supplied with electric current to armature coils in synchronism with rotating magnetic field generated by rotation of the permanent magnets provided in the rotor. In rotor 10 of the rotary electric machine, d-axis and q-axis are defined as shown in FIG. 1. D-axis inductance Ld can be higher than q-axis inductance Lq (Ld>Lq), and hence rotor 10 of the rotary electric machine has saliency. On the other hand, d-axis inductance Ld can be lower than q-axis inductance Lq (Ld<Lq), and rotor 10 of the rotary electric machine has inverse saliency.

In the permanent magnet motor of the inverse saliency, d-axis current needs to be negative for generating reluctance torque. The negative d-axis current stands for supplying the electric current to the armature coils so as to counteract the magnetic flux of the permanent magnets. That is, reverse magnetic field is applied to the permanent magnets. When the reverse magnetic field is applied to the permanent magnets, eddy current flows inside the permanent magnets to generate magnetic field to counteract the reverse magnetic field. This eddy current becomes loss inside the permanent magnets, and increases temperature of the permanent magnets. Therefore, the permanent magnets are permanently demagnetized in operating points to apply the high reverse magnetic field for the temperature increase of the permanent magnets.

To achieve the high torque by a small amount of the permanent magnets, decrease in the torque by the magnetic flux from the permanent magnets is compensated with the reluctance torque. In the rotary electric machine of the inverse saliency, high magnetic reluctance needs to be inserted into d-axis magnetic path, that is, magnetic circuit for permanent magnet flux. In this case, as the amount of the permanent magnets is increased, the amount of the magnetic reluctance is increased. Accordingly, the amount of the permanent magnets needs to be further increased. Moreover, to output necessary reluctance torque, the negative d-axis current needs to be supplied, as mentioned above. However, the d-axis current is practically limited not to demagnetize the permanent magnets. By this limitation, it is not possible to increase the reluctance torque, and thereby to increase the torque.

In the rotary electric machine of the saliency, because the magnetic circuit reluctance to the permanent magnet flux is low, and it is possible to generate the permanent magnetic flux by the small amount of the permanent magnets as compared with the rotary electric machine of the inverse saliency. Since the d-axis current is supplied so as to strengthen the magnetic field, and it is possible to output the reluctance torque by decreasing demagnetization by reverse magnetic field. Rotor 10 for the rotary electric machine according to embodiment of the present invention has a rotor structure to achieve these states.

As shown in FIG. 1, adjacent two of the permanent magnets have axisymmetrical trapezoids in a plane. Each of the permanent magnets has a trapezoid cross section including side portions extending radially. Each N pole is formed by two of N pole permanent magnets 13 confronting each other circumferentially, and being separated circumferentially from each other. Each S pole is formed by two of S pole permanent magnets 14 confronting each other circumferentially, and being separated circumferentially from each other. Between each N pole permanent magnet 13 and one S pole permanent magnet 14 adjacent to that N pole permanent magnet 13, there is provided a recessed portion 15 opened in the outer circumference of rotor core 11, and recessed radially inwards from the outer circumference of rotor core 11. Each of recessed portions 15 extend axially from a first axial end surface of rotor core 11, to a second axial end surface of rotor 10 to pass through rotor core 11. Each of recessed portions 15 has a radial length or depth which is a substantially half of a radial length of the permanent magnets. Between adjacent two of the permanent magnets of the opposite polarities, there is provided one recessed portion 15 as an air layer. That is, the permanent magnets are so arranged that the magnetic reluctance in the radial direction, between adjacent two of the permanent magnets of the same polarity is lower than the magnetic reluctance in the radial direction, along the outer surface of the permanent magnets.

In the rotary electric machine according to the first embodiment, the q-axis reluctance is increased, and thereby the q-axis inductance can be decreased. Moreover, the air layer is not provided between adjacent two of the permanent magnets of the same polarity. The d-axis magnetic flux travels a path formed between adjacent two of the permanent magnets of the same polarity, and the d-axis reluctance is lower than the q-axis reluctance. Therefore, d-axis inductance Ld can be higher than q-axis inductance Lq (Ld>Lq), and rotor 10 of the rotary electric machine has the saliency.

Figure 2:
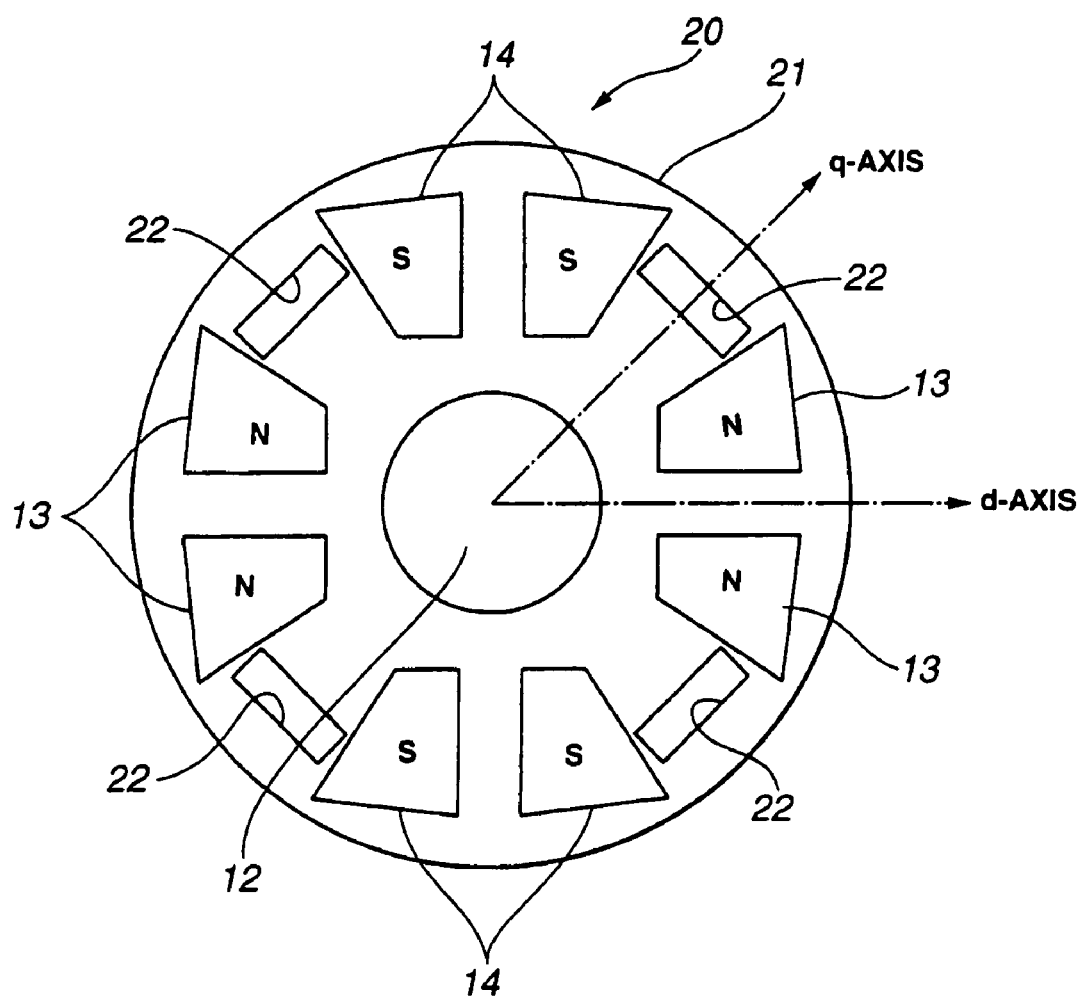
FIG. 2 is a plan view showing a rotor for a rotary electric machine according to a second embodiment of the present invention.

FIG. 2 shows a rotor 20 for a rotary electric machine according to a second embodiment of the present invention. As shown in FIG. 2, rotor 20 of the rotary electric machine includes a rotor core 21, slits 22 employed in place of recessed portions 15, and each having opening being in the form of a wider rectangular shape. Each slit 22 is so formed that longer sides thereof are perpendicular to the q-axis. Each slit 22 is located at a radial position slightly outside a center position of the radial length of one of permanent magnets 13 and 14. Between adjacent two of the permanent magnets of the opposite polarities, there is provided one slit 22 as the air layer. In the other respects, rotor 20 is substantially identical to rotor 10 in structure and operation. Accordingly, the q-axis reluctance is higher than the d-axis reluctance, and it is possible to achieve the saliency.

Figure 3:
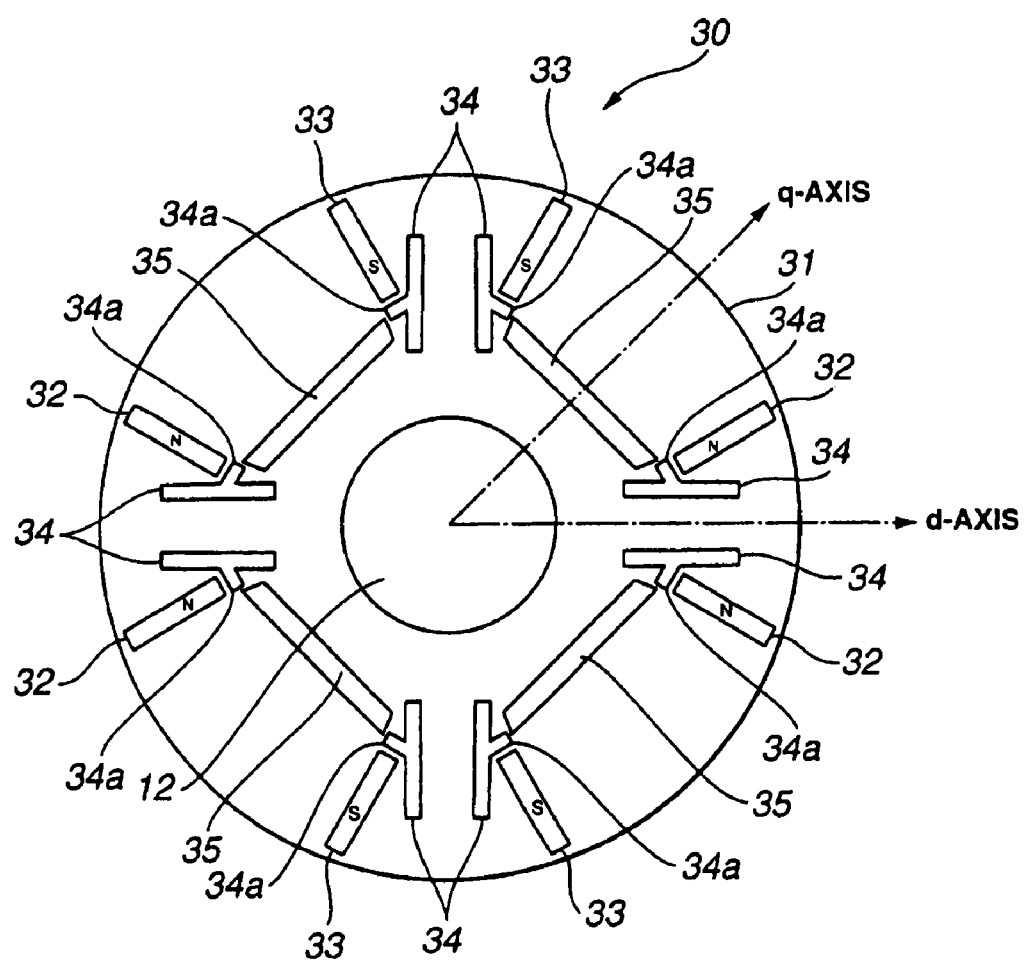
FIG. 3 is a plan view showing a rotor for a rotary electric machine according to a third embodiment of the present invention.

FIG. 3 shows a rotor 30 for a rotary electric machine according to a third embodiment of the present invention. As shown in FIG. 3, rotor 30 of the rotary electric machine includes a rotor core 31 provided with N pole permanent magnets 32 and S pole permanent magnets 33. Each of N pole permanent magnets 32 and S pole permanent magnets 33 is in the form of a narrow rectangular shape or elongated rectangular shape in the plane, and has longer sides extending substantially along the radial direction of the rotor core. Adjacent two of N pole permanent magnets 32 are paired in a V-shaped form, and arranged circumferentially at a predetermined angle. Adjacent two of S pole permanent magnets 33 are paired in a V-shaped form, and arranged circumferentially at a predetermined angle. That is, two permanent magnets of each magnet set are arranged to be tapered to the center of rotor core 31. Between adjacent two of the permanent magnets of the same polarity, there are provided two first slits 34, 34. Between adjacent two of the permanent magnets of the opposite polarities (or Between adjacent two of the magnet sets), there is provided a second slit 35. In the other respects, rotor 30 is substantially identical to rotor 10 in structure and operation.

Adjacent two of first slits 34, 34 are arranged to extend in parallel to the d-axis respectively. Each first slit 34 extends from a first end located at a radial position which is a center position of the radial length of one permanent magnet, to a second end located on the shaft 12's side of one second slit 35. Each of first slits 34 includes a branch portion 34a. Each of branch portion 34a is located on the shaft 12's side of a shaft 12's side end or radial inner end of one permanent magnet, and extends toward second slit 35 alongside the radial inner end of that permanent magnet to cover the radial inner end of that permanent magnet radially. Adjacent two of first slits 34 are mirror symmetric with respect to a line which radiates radially from the axis of rotor core 31. Each of second slits 35 is located between adjacent two of the permanent magnets of the opposite polarities, on the shaft 12's side of the radial inner ends of these adjacent two permanent magnets, and so disposed that the longer sides of that second slit 35 are perpendicular to the q-axis.

The permanent magnets are so arranged that adjacent two of the permanent magnets of the same polarity are paired in a V-shaped form. As compared with the arrangement in which adjacent two of the permanent magnets of the same polarity are parallel to each other (rotors 10 and 20 as shown in FIGS. 1 and 2), it is possible to increase the magnetic flux linked with the stator. Adjacent two of first slits 34 of the air layer are disposed to extend in parallel to a radial direction, and to confront each other circumferentially between adjacent two of the permanent magnets of the same polarity. Therefore, it is possible to reduce the flux leakage at ends of the permanent magnets, and to increase the q-axis reluctance. Accordingly, d-axis inductance Ld can be higher than q-axis inductance Lq (Ld>Lq), and rotor 30 for the rotary electric machine has the saliency.

Figure 4:
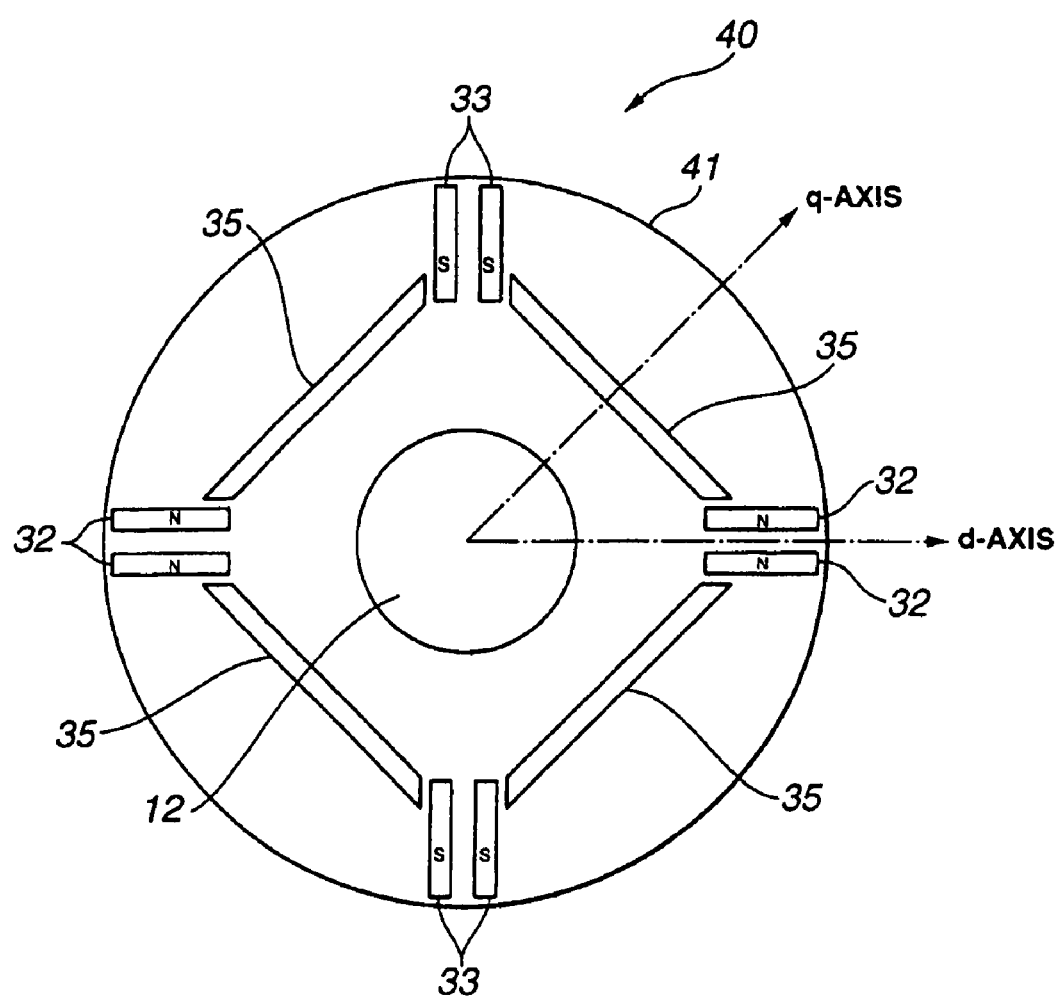
FIG. 4 is a plan view showing a rotor for a rotary electric machine according to a fourth embodiment of the present invention.

FIG. 4 shows a rotor 40 for a rotary electric machine according to a fourth embodiment of the present invention. As shown in FIG. 4, rotor 40 of the rotary electric machine includes a rotor core 41 provided with N pole permanent magnets 32 and S pole permanent magnets 33. Adjacent two of the permanent magnets of the same polarity are arranged to be parallel to the d-axis, and to be separated from each other in the circumferential direction. This rotor 40 is not formed with first slits 34, and includes second slits 35 each extending from a first end located on side of one of adjacent two of the permanent magnets of the opposite polarities, and located on the shaft 12's side of this permanent magnet, to a second end located on side of the other of these adjacent two permanent magnets, and located on the shaft 12's side of that permanent magnet. In the other respects, rotor 40 is substantially identical to rotor 30 in structure and operation.

In this forth embodiment, adjacent two of the permanent magnets of the same polarity are arranged to extend in parallel to the radial direction, and not to be in the form of the V shape. Between adjacent two of the permanent magnets of the opposite polarities (or Between adjacent two of the magnet sets), there is provided second slit 35 of the air layer. Each of second slits 35 of the nonmagnetic portion extends from a first end located near one of adjacent two of the magnet sets, to a second end located near the other of the adjacent two of the magnet sets. The permanent magnets are so arranged that a length between adjacent two of the permanent magnets of the same polarity is much shorter than a length between adjacent two of the permanent magnets of the opposite polarities. That is, a pitch between adjacent two of the permanent magnets of the opposite polarities becomes greater than a pitch between adjacent two of the permanent magnets of the same polarity, and hence a core area or cross sectional area surrounded by adjacent two of the permanent magnets of the opposite polarities, second slit 35, and the outer circumference of rotor core 41 is increased. Accordingly, the d-axis magnetic reluctance is held lower than the q-axis magnetic reluctance, and the q-axis magnetic reluctance can be higher than the d-axis magnetic reluctance. Therefore, d-axis inductance Ld can be higher than q-axis inductance Lq (Ld>Lq), and it is possible to achieve the saliency.

Figure 5:
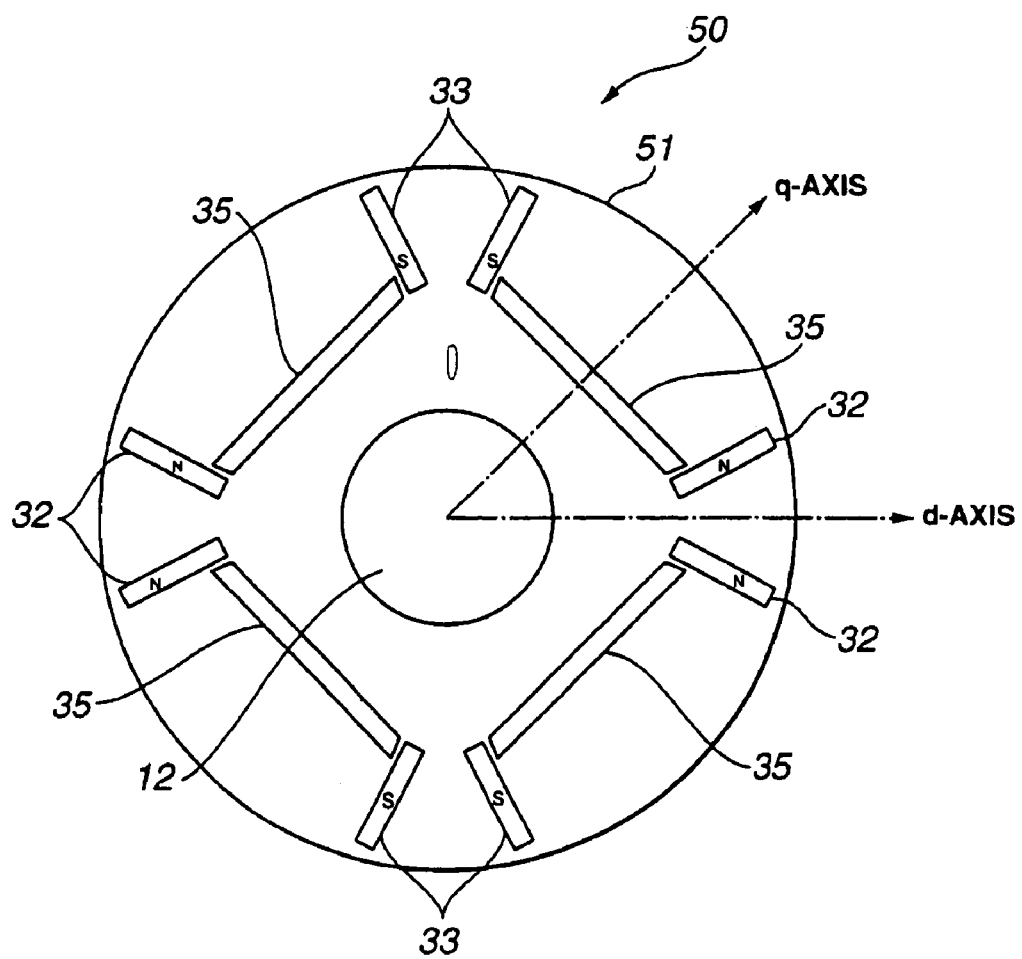
FIG. 5 is a plan view showing a rotor for a rotary electric machine according to a fifth embodiment of the present invention.

FIG. 5 shows a rotor 50 for a rotary electric machine according to a fifth embodiment of the present invention. As shown in FIG. 5, rotor 50 of the rotary electric machine includes a rotor core 51 provided with N pole permanent magnets 32 and S pole permanent magnets 33. Each of N pole permanent magnets 32 and S pole permanent magnets 33 has longer sides extending substantially along the radial direction of the rotor core. Adjacent two of N pole permanent magnet 32 are paired in a V-shaped form, and separated circumferentially from each other. Adjacent two of S pole 33 are paired in a V-shaped form, and separated circumferentially from each other. In the other respects, rotor 50 is substantially identical to rotor 40 in structure and operation.

Adjacent two of the permanent magnets of the same polarity are not disposed parallel to each other, and are disposed to extend radially in the V-shaped form. Therefore, the core area surrounded by the permanent magnets of the opposite polarities, second slit 35, and the outer circumference of rotor core 51 becomes smaller than the core area of rotor 40, and the ratio between d-axis inductance Ld and q-axis inductance Lq (saliency ratio Ld/Lq) becomes lower. However, the magnetic flux from the permanent magnets can be increased.

In the arrangement according to these embodiments of the present invention, each of the nonmagnetic portions is disposed between adjacent two of the permanent magnets of the opposite polarities, and thereby the magnetic reluctance in the radial direction of the rotor, between adjacent two of the permanent magnets of the same polarity arranged circumferentially is lower than the magnetic reluctance along the outer surface of the permanent magnets. Accordingly, d-axis inductance Ld can be higher than q-axis inductance Lq (Ld>Lq), and the rotor has the saliency.

The rotary electric machine has the saliency, and thereby the magnetic circuit reluctance to the magnetic flux from the permanent magnets becomes low. Therefore, it is possible to generate the magnetic flux by the small quantity of the permanent magnets, as compared with the rotary electric machine of the inverse saliency. Moreover, because the d-axis current flows to strengthen the magnetic field, and it is possible to output the reluctance torque by decreasing the demagnetize by the reverse magnetic field. Therefore, the rotary electric machine of the saliency prevents the permanent magnets from demagnetizing, and can operate at the high temperature.

In these embodiments, the air layers are formed by recessed portions 15, slits 22, first slits 34, and second slits 35. The air layers are not limited to these examples. It is possible to achieve the same effect as the air layers by nonmagnetic material embedded in recessed portions 15, slits 22, first slits 34, and second slits 35. The nonmagnetic material can be cooper, stainless, aluminum, brass, and so on. N pole permanent magnets 13 (32), S pole permanent magnets 14 (33), recessed portions 15, slits 22, first slits 34, and second slits 35 can be arbitrarily combined in accordance with the arrangement.

This application is based on a prior Japanese Patent Application No. 2004-265642. The entire contents of the Japanese Patent Application No. 2004-265642 with a filing date of Sep. 13, 2004 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A rotor for a rotary electric machine, comprising:
   a rotor core made of magnetic material, and being in the form of a disk; and
   a plurality of magnet sets each including a pair of permanent magnets whose polarities are identical to each other, the magnet sets being arranged circumferentially in the rotor core so that the polarities of the magnet sets change alternately;
   the rotor core including nonmagnetic portions each formed between adjacent two of the magnet sets,
   wherein adjacent two of the permanent magnets of the same polarity extend radially, and are arranged circumferentially at a predetermined angle,
   wherein the rotor core includes slits; adjacent two of the slits extend in parallel to a radial direction of the rotor core, circumferentially between adjacent two of the permanent magnets of the same polarity, and each of the slits includes a branch portion extending toward one of the nonmagnetic portions alongside one of the adjacent two of the permanent magnets.

2. A rotor for a rotary electric machine, comprising:
   a rotor core made of magnetic material, and being in the form of a disk; and
   a plurality of magnet sets each including a pair of permanent magnets whose polarities are identical to each other, the magnet sets being arranged circumferentially in the rotor core so that the polarities of the magnet sets change alternately;
   the rotor core including nonmagnetic portions each formed between adjacent two of the magnet sets,
   wherein the nonmagnetic portions are so formed that a cross sectional area surrounded by adjacent two of the permanent magnets of the opposite polarities, one of the nonmagnetic portions between the adjacent two of the permanent magnets, and an outer circumference of the rotor core is maximized.

3. A rotor for a rotary electric machine, comprising:
   a rotor core made of magnetic material, and being in the form of a disk; and
   a plurality of magnet sets each including a pair of permanent magnets whose polarities are identical to each other, the magnet sets being arranged circumferentially in the rotor core so that the polarities of the magnet sets change alternately;
   the rotor core including nonmagnetic portions each formed between adjacent two of the magnet sets,
   wherein adjacent two of the permanent magnets of the same polarity are arranged to extend in parallel to a radial direction of the rotor core; and the permanent magnets are so arranged that a pitch between adjacent two of the permanent magnets of the opposite polarities, is greater than a pitch between adjacent two of the permanent magnets of the same polarity.

4. A rotor for a rotary electric machine, comprising:

a rotor core made of magnetic material, and being in the form of a disk; and a plurality of magnet sets each including a pair of permanent magnets whose polarities are identical to each other, the magnet sets being arranged circumferentially in the rotor core so that the polarities of the magnet sets change alternately;

the rotor core including nonmagnetic portions each formed between adjacent two of the magnet sets;

wherein the magnetic material of the rotor core exists continuously on a d-axis from an inner circumference of the rotor core to an outer circumference of the rotor core, wherein each of the nonmagnetic portions between adjacent two of the magnet sets is positioned on a q-axis, and wherein a d-axis inductance is higher than a q-axis inductance.

5. The rotor as claimed in claim 4, wherein the nonmagnetic portions are air layers opened in the rotor core.

6. The rotor as claimed in claim 4, wherein each of the nonmagnetic portions extends from a first end located near one of adjacent two of the magnet sets, to a second end located near the other of the adjacent two of the magnet sets.

7. The rotor as claimed in claim 4, wherein each of the nonmagnetic portions is a recessed portion recessed radially inwards from an outer surface of the rotor core.

8. The rotor as claimed in claim 7, wherein each of the permanent magnets has a trapezoid cross section including side portions each extending radially.

9. The rotor as claimed in claim 4, wherein adjacent two of the permanent magnets of the same polarity extend radially, and are arranged circumferentially at a predetermined angle.

10. The rotor as claimed in claim 4, wherein two of the permanent magnets of one of the magnet sets are separated circumferentially from each other.

* * * * *